US007036425B2

(12) United States Patent
Chang

(10) Patent No.: US 7,036,425 B2
(45) Date of Patent: May 2, 2006

(54) CONTROL MECHANISM FOR DEEP FRYER TO CONTROL ELEVATION OF BASKET RECEIVED IN THE DEEP FRYER

(75) Inventor: Li-Chen Wu Chang, Pa-Te (TW)

(73) Assignee: Lyu Jan Co., Ltd., Taoyuan Hsien (TW)

( * ) Notice: Subject to any disclaimer, the term of this patent is extended or adjusted under 35 U.S.C. 154(b) by 136 days.

(21) Appl. No.: 10/861,501

(22) Filed: Jun. 7, 2004

(65) Prior Publication Data

US 2005/0268792 A1 Dec. 8, 2005

(51) Int. Cl.
*A47J 37/12* (2006.01)

(52) U.S. Cl. .............................. 99/336; 99/348; 99/403; 99/407; 99/409; 99/410

(58) Field of Classification Search ................. 99/330, 99/334–336, 403–418; 210/167, DIG. 8; 126/391.1; 426/438, 445
See application file for complete search history.

(56) References Cited

U.S. PATENT DOCUMENTS

| | | | | |
|---|---|---|---|---|
| 3,709,048 A | * | 1/1973 | Stepanek et al. ............... 74/53 |
| 3,718,485 A | * | 2/1973 | Lankford .................... 426/438 |
| 3,731,614 A | * | 5/1973 | Smith et al. ................. 99/404 |
| 3,908,534 A | * | 9/1975 | Martin ........................ 99/418 |
| 4,542,685 A | * | 9/1985 | Wilson ........................ 99/413 |
| 4,574,776 A | * | 3/1986 | Hidle ......................... 126/369 |
| 4,580,549 A | * | 4/1986 | Sato ......................... 126/391.1 |
| 4,793,324 A | * | 12/1988 | Caferro ....................... 126/369 |
| 5,033,369 A | * | 7/1991 | Wu ............................. 99/408 |
| 5,195,424 A | * | 3/1993 | Guajaca ....................... 99/418 |
| 5,323,693 A | * | 6/1994 | Collard et al. ............... 99/425 |
| 5,379,684 A | * | 1/1995 | Ettridge ...................... 99/336 |
| 5,431,092 A | * | 7/1995 | Guillory ...................... 99/410 |
| 5,746,117 A | | 5/1998 | Chang ......................... 99/407 |
| 5,771,781 A | * | 6/1998 | Sham .......................... 99/336 |
| 5,931,081 A | * | 8/1999 | Sham et al. .................. 99/336 |
| 6,305,270 B1 | * | 10/2001 | Wang .......................... 99/336 |

FOREIGN PATENT DOCUMENTS

DE 20000933.8 3/2000

* cited by examiner

*Primary Examiner*—Timothy F. Simone
(74) *Attorney, Agent, or Firm*—Rabin & Berdo, P.C.

(57) ABSTRACT

A control mechanism includes a driving device and a driven device coupling a bracket that is movably arranged in the deep fryer to the driving device. The driving device drives the basket upward/downward relative to the deep fryer. The driven device has a seat, a guiding slot, a limit having a guiding shaft extending upward to correspond to and be received in the guiding slot and an enclosure enclosing the seat and fixed to a portion of the driving device. A recoil spring is arranged at a rear side of the limit and the pushbutton. The bracket includes a first U-shaped arm and a second U-shaped arm pivotally received in a first pivot cutout and a second pivot cutout in the enclosure respectively.

3 Claims, 6 Drawing Sheets

CONTROL MECHANISM FOR DEEP FRYER TO CONTROL ELEVATION OF BASKET RECEIVED IN THE DEEP FRYER

BACKGROUND OF THE INVENTION

1. Field of the Invention

The present invention relates to a control mechanism, and more particularly to a control mechanism for a deep fryer such that movement of a basket received in the deep fryer is auto-controlled.

2. Description of Related Art

Normally, a basket in a deep fryer is manually controlled so that the preparation of food is totally dependent on the experiences of the chef. Before becoming a qualified chef, the apprentice has to suffer a lot from the boiling frying oil in the deep fryer. A lot of food is thus wasted due to inexperienced work of the apprentice.

In order to reduce the danger coming from the deep fryer, it is better not to use manual to control the movement of the basket out of the deep fryer. To achieve this goal, the operator has to set up a control mechanism to control the movement of the basket into and away from the deep fryer.

To overcome the shortcomings, the present invention intends to provide an improved control mechanism to mitigate the aforementioned problems.

SUMMARY OF THE INVENTION

The primary objective of the invention is to provide an improved control mechanism for controlling the movement of the basket in the deep fryer so that the movement of the basket is a manual-free movement and thus danger coming from the high temperature frying oil is reduced.

Another objective of the invention is to provide a guiding rod along with the control mechanism to increase the movement stability of the basket.

Other objects, advantages, and novel features of the invention will become more apparent from the following detailed description when taken in conjunction with the accompanying drawings.

DETAILED DESCRIPTION OF PREFERRED EMBODIMENT

Figure 1:
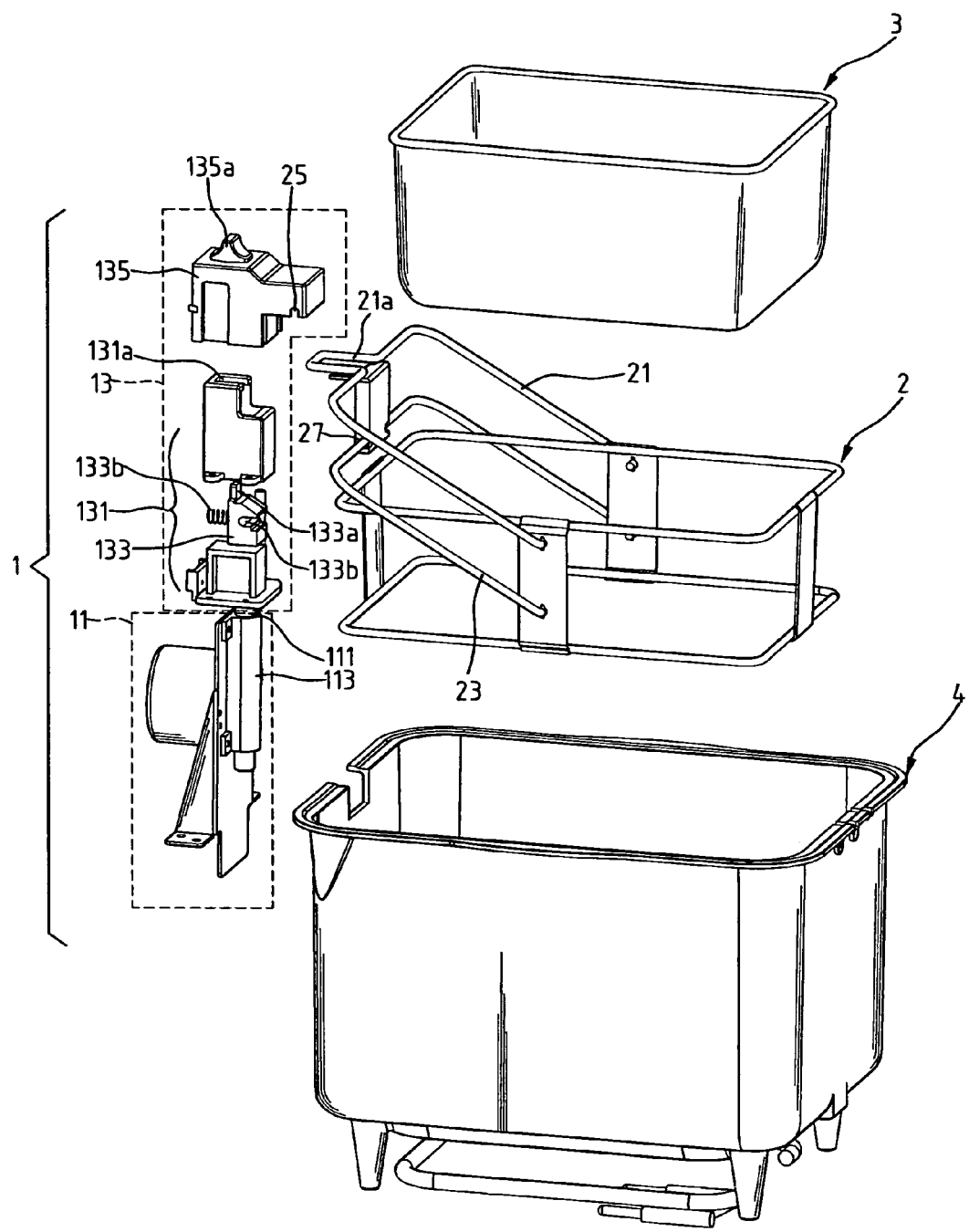
FIG. 1 is an exploded perspective view of a control mechanism in accordance with the present invention.
Figure 2:
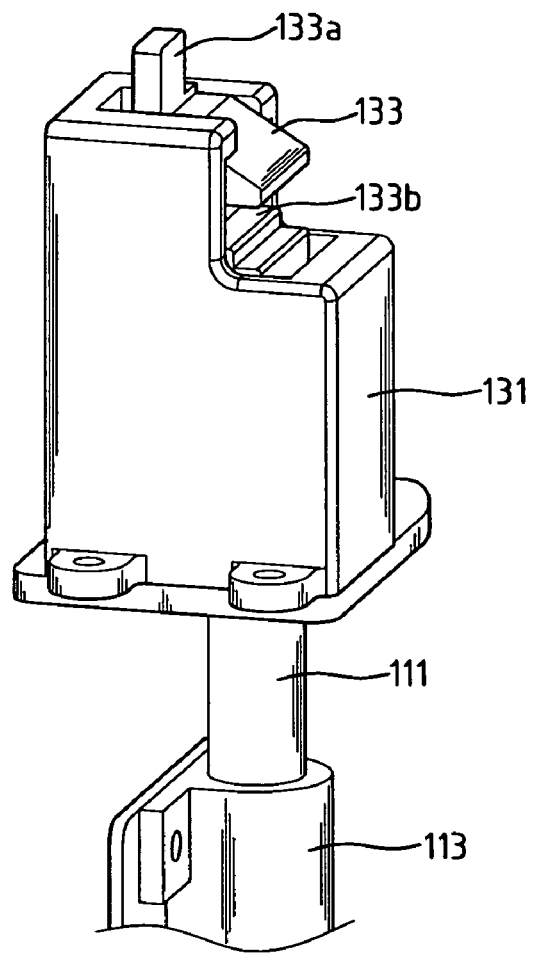
FIG. 2 is a perspective view of the assembly between a driving rod and a driving seat of the control mechanism of the present invention.
Figure 3:
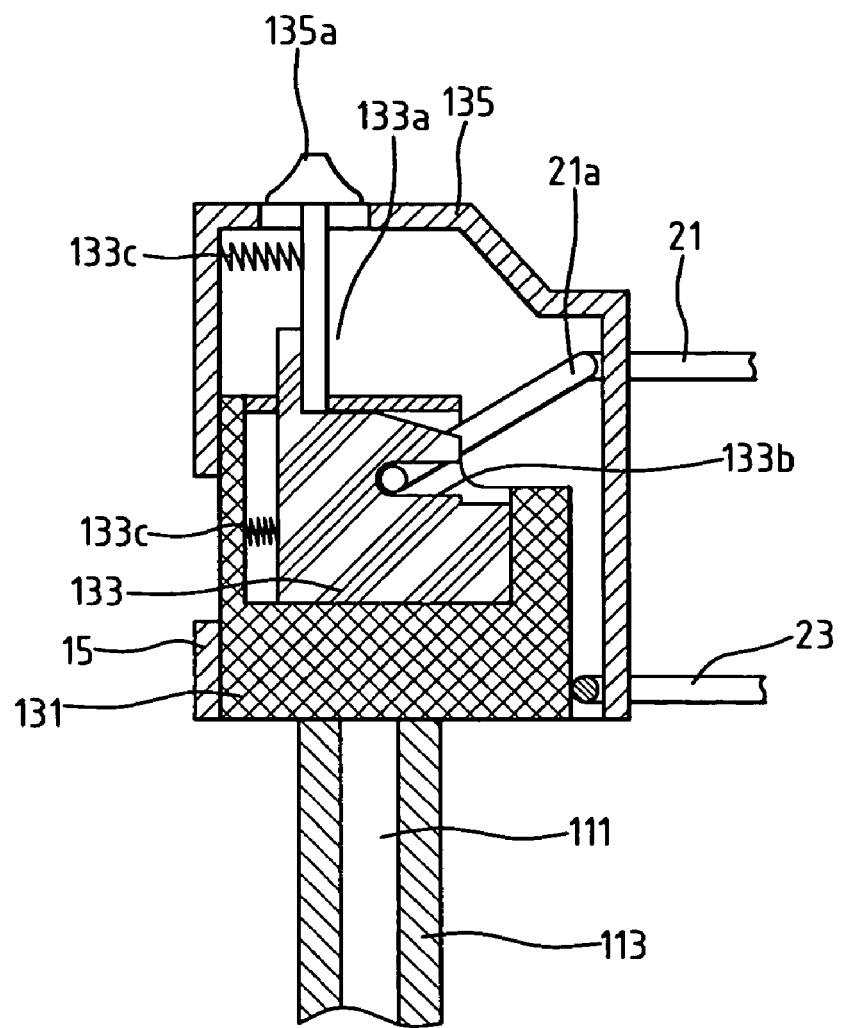
FIG. 3 is a schematic cross-sectional view showing the assembly of the control mechanism of the present invention.
Figure 4:
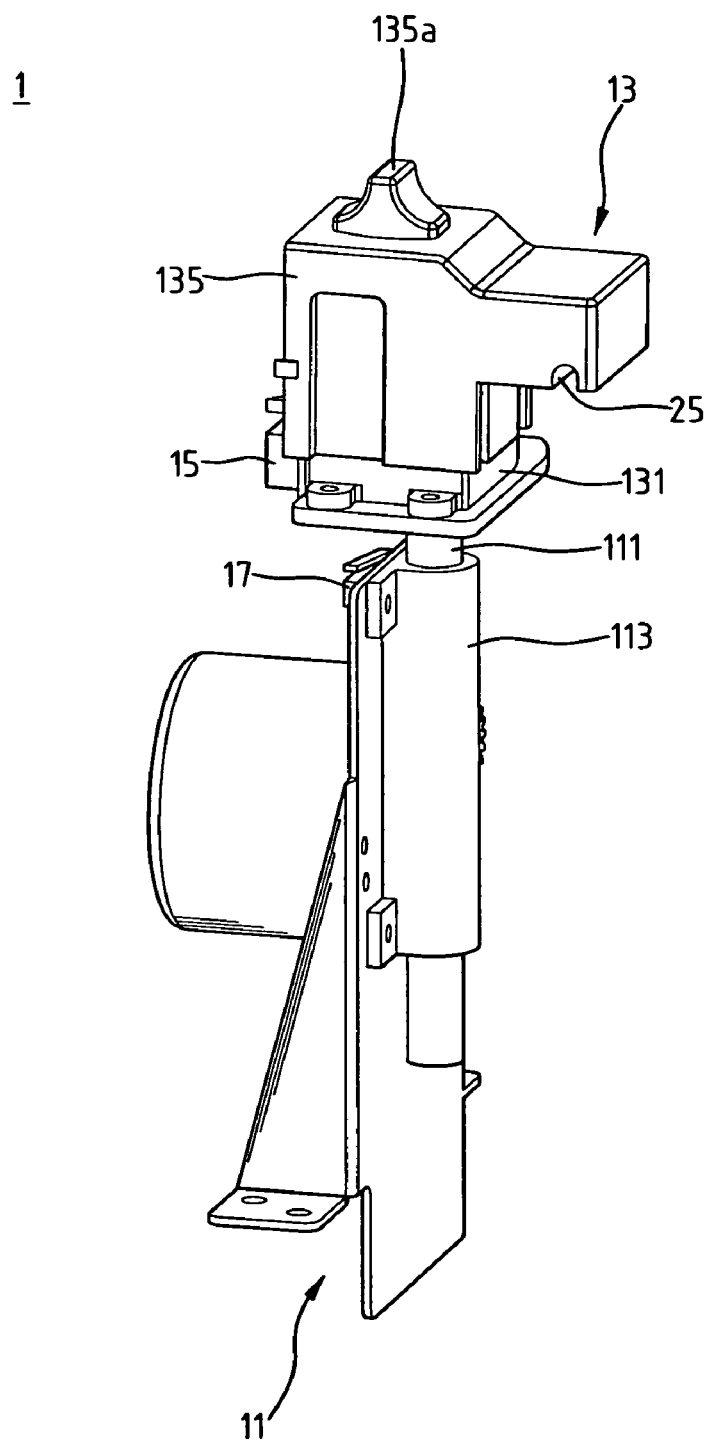
FIG. 4 is a perspective view of the control mechanism of the present invention.

With reference to FIGS. 1–4, it is noted that the control mechanism in accordance with the present invention includes a driving device 1 and a bracket 2 pivotally connected to the driving device 1 for controlling movement of a basket 3 located inside a deep fryer 4.

The driving device 1 has a motor 11 with a motor shaft 111 received in a sleeve 113 to alternately extend out of the sleeve 113, a driven device 13 coupling the bracket 2 to the motor 11 and having a seat 131 fixedly mounted on a free end of the motor shaft 111, a guiding slot 131a defined in a top portion of the seat 131, a limit 133 formed inside the seat 131 and having a guiding shaft 133a extending upward from a top face of the limit 133 to correspond to and be received in the guiding slot 131a to allow the limit 133 to move horizontally inside the seat 131 due to the limit of space inside the seat 131 and an enclosure 135 enclosing the seat 131 and fixed to a portion o the motor 11, the enclosure 135 having a pushbutton 135a slidably mounted on top of the enclosure 135 such that movement of the motor shaft 111 is able to drive the seat 131 to move. A recoil spring 133c is provided to a rear side of the limit 133 and the pushbutton 135a respectively so that the recoil force from the recoil spring 133c is able to return the limit 133 after the limit 133 is moved.

The bracket 2 is able to have the basket 3 received therein and includes a first U-shaped arm 21 and a second U-shaped arm 23 pivotally extending out to be pivotally received in a first pivot cutout 25 and a second pivot cutout 27 in the enclosure 135 respectively. The first U-shaped arm 21 further has a bend 21a formed in a mediate portion of the first U-shaped arm 21 to be pivotally received in a cutout 133b defined in the limit 133.

Figure 5:
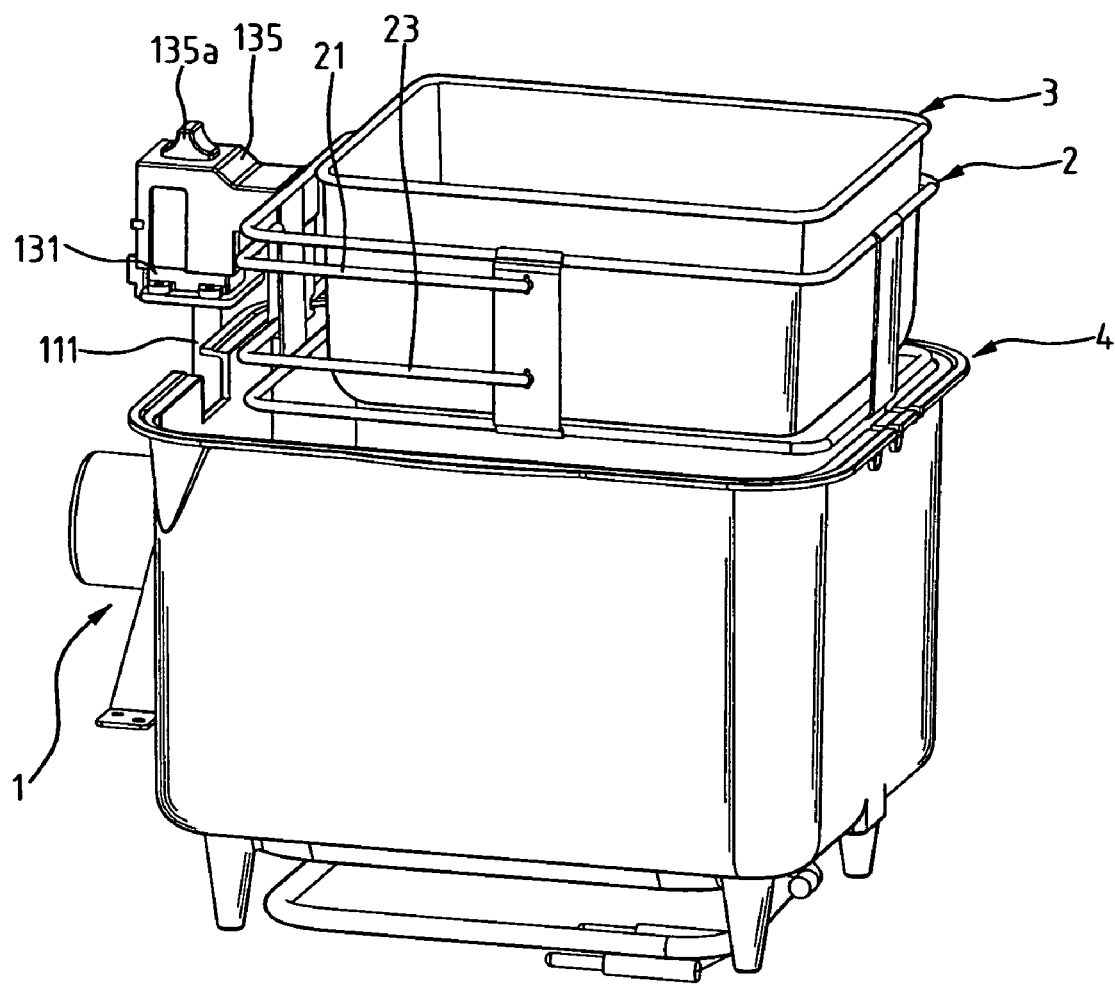
FIG. 5 is a perspective view showing the control mechanism assembled with a basket in a deep fryer.

With reference to FIG. 5, after the control mechanism of the present invention is assembled, the movement of the motor shaft 111 is able to drive the seat 131 to move upward or downward. Because the guiding shaft 133a is received in the guiding slot 131a, the movement of the limit 133 is limited in a horizontal direction inside the enclosure 135 only. Therefore, when the motor shaft 111 is driving the seat 131 to move upward, the limit 133 is moved to drive the bend 21a to pivot downward using the first pivot hole 25 as a pivot point. As a consequence of this downward movement, the basket 3 is moved into the deep fryer 4. However, when the motor shaft 111 is driving the seat 131 to move downward, the limit 133 is moved to drive the bend 21a to pivot upward. As a consequence of this upward movement, the basket 3 is moved away from the deep fryer 4.

Referring to FIG. 4 again, it is noted that a first sensor 15 and a second sensor 17 are provided to the control mechanism 1 of the present invention to sense the maximum upward and downward positions of the basket 3 so that when the basket 3 reaches a maximum position (highest and lowest positions allowable), the first or second sensor 15, 17 is able to send a signal to the motor 11 to stop motion of the motor 11.

Figure 6:
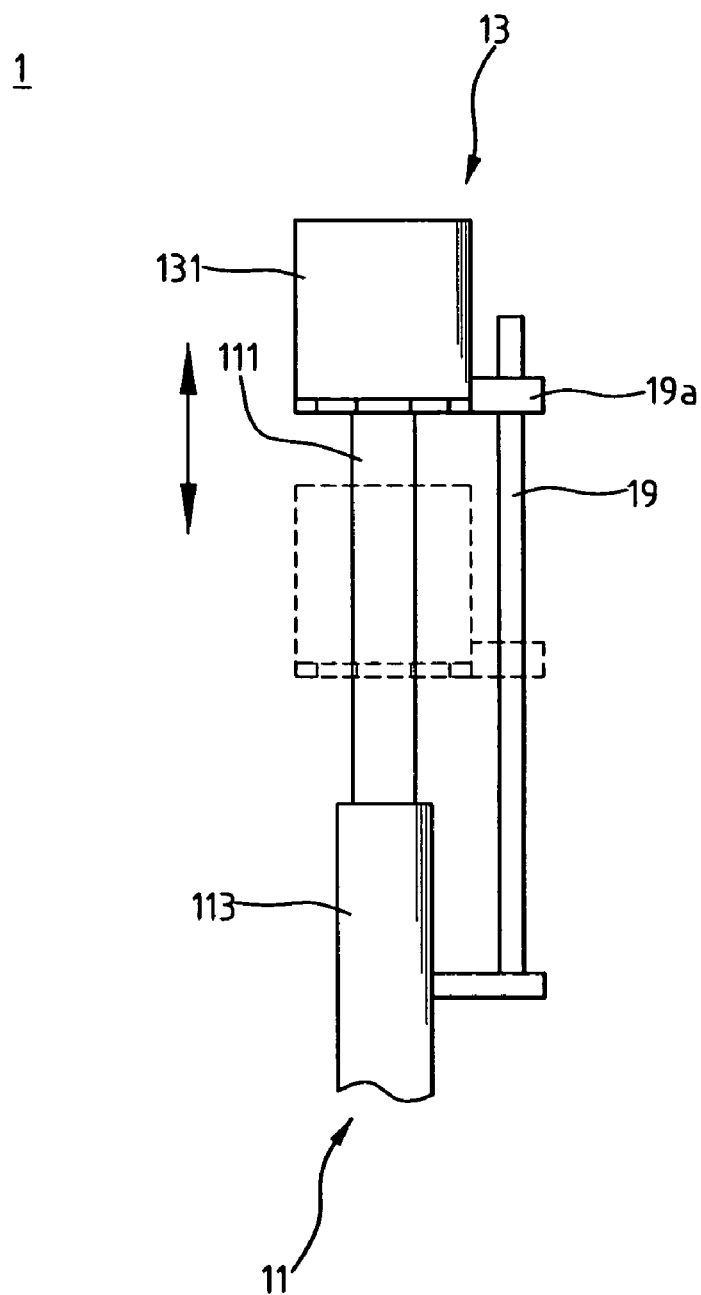
FIG. 6 is a schematic view of a guiding rod attached to the control mechanism to increase movement stability of the basket inside the deep fryer.

With reference to FIG. 6, it is noted that a guiding rod 19 is fixed on a side o the motor shaft 111 and the enclosure 135 has a ring 19a formed on a outer side face of the enclosure 135 to allow the free end of the guiding rod 19 to extend therethrough such that when the seat 131 together with the enclosure 135 is moved, with the assistance of the guiding rod 19, the movement ability of the enclosure 135 is increased.

From the above description, it is noted that the control mechanism of the present invention is able to accomplish the following advantages: (1) fully automated frying procedures; (2) simple and stable mechanism; (3) position sensing ability with the sensors; and (4) movement ability with the guiding rod.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mechanism for controlling a basket in a deep fryer, the mechanism comprising:
   a bracket to hold the basket;
   a driving device coupled to the basket through the mechanism and adapted to move the basket upward and downward relative to the deep fryer;
   a driven device coupling the bracket to the driving device and including a seat fixedly mounted on a free end of the driving device, a guiding slot defined in a top portion of the seat, a limit formed inside the seat and having a guiding shaft extending upward from a top face of the limit to correspond to and be received in the guiding slot to allow the limit to move horizontally inside the seat and an enclosure enclosing the seat and fixed to a portion of the driving device, the enclosure having a pushbutton slidably mounted on top of the enclosure such that movement of the driving device causes the seat to move;
   a recoil spring arranged at a rear side of the limit and the pushbutton respectively so that a recoil force of the recoil spring returns the limit after the limit is moved; and
   a bracket receiving the basket therein and comprising a first U-shaped arm and a second U-shaped arm pivotally extending out to be pivotally received in a first pivot cutout and a second pivot cutout in the enclosure respectively, the first U-shaped arm further having a bend formed in a mediate portion of the first U-shaped arm to be pivotally received in a cutout defined in the limit;
   wherein the driving device comprises a motor;
   wherein the driving device comprises a motor shaft alternately extending out of the motor and a sleeve securely formed on a side of the motor to receive therein the motor shaft; and
   further comprising a guiding rod securely provided beside the motor shaft and a ring formed on an outer side face of the enclosure to allow a free end of the guiding rod to extend therethrough.

2. The mechanism as claimed in claim 1 further comprising a first sensor and a second sensor to sense position maximum of the basket so as to send a signal to the motor of the driving device to stop motion of the motor.

3. A mechanism for controlling a basket in a deep fryer, the mechanism comprising:
   a bracket to hold the basket;
   a driving device coupled to the basket through the mechanism and adapted to move the basket upward and downward relative to the deep fryer;
   a driven device coupling the bracket to the driving device and including a seat fixedly mounted on a free end of the driving device, a guiding slot defined in a top portion of the seat, a limit formed inside the seat and having a guiding shaft extending upward from a top face of the limit to correspond to and be received in the guiding slot to allow the limit to move horizontally inside the seat and an enclosure enclosing the seat and fixed to a portion of the driving device, the enclosure having a pushbutton slidably mounted on top of the enclosure such that movement of the driving device causes the seat to move;
   a recoil spring arranged at a rear side of the limit and the pushbutton respectively so that a recoil force of the recoil spring returns the limit after the limit is moved; and
   a bracket receiving the basket therein and comprising a first U-shaped arm and a second U-shaped arm pivotally extending out to be pivotally received in a first pivot cutout and a second pivot cutout in the enclosure respectively, the first U-shaped arm further having a bend formed in a mediate portion of the first U-shaped arm to be pivotally received in a cutout defined in the limit;
   further comprising a first sensor and a second sensor to sense position maximum of the basket so as to send a signal to the driving device to stop motion of the driving device.

* * * * *